US009253039B2

(12) United States Patent
Kodama

(10) Patent No.: US 9,253,039 B2
(45) Date of Patent: Feb. 2, 2016

(54) DEVICE MANAGEMENT SYSTEM AND DEVICE MANAGEMENT APPARATUS

(71) Applicant: FUJITSU LIMITED, Kawasaki-shi (JP)

(72) Inventor: Hiroyoshi Kodama, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 13/740,716

(22) Filed: Jan. 14, 2013

(65) Prior Publication Data

US 2013/0254428 A1 Sep. 26, 2013

(30) Foreign Application Priority Data

Mar. 23, 2012 (JP) .................. 2012-068350

(51) Int. Cl.
*H04L 12/24* (2006.01)
*G06F 15/16* (2006.01)
(Continued)

(52) U.S. Cl.
CPC .............. *H04L 41/0866* (2013.01); *G06F 1/26* (2013.01); *G06F 11/004* (2013.01); *G06F 11/22* (2013.01); *G06F 15/161* (2013.01); *H04L 41/08* (2013.01)

(58) Field of Classification Search
CPC ......... H04L 41/28; H04L 67/16; H04L 41/08; H04L 41/0803; H04L 41/085; H04L 41/0866; H04L 41/0869; H04B 10/073; G06F 15/161; G06F 1/26; G06F 11/004; G06F 11/006; G06F 11/007; G06F 11/0796; G06F 11/22; G06F 11/2247; G06F 11/3051
USPC .......... 709/203, 220, 223, 224, 227, 245, 250
See application file for complete search history.

(56) References Cited

U.S. PATENT DOCUMENTS 4,644,541 A * 2/1987 Linkowski ...................... 714/49
6,175,798 B1 * 1/2001 Carpenter ....................... 701/76
(Continued)

FOREIGN PATENT DOCUMENTS

JP 60-20354 2/1985
JP 2003-303019 10/2003
(Continued)

OTHER PUBLICATIONS

Office Action issued by the Japanese Patent Office on Oct. 20, 2015 in corresponding Japanese patent application No. 2012-068350.

*Primary Examiner* — Ramy M Osman
(74) *Attorney, Agent, or Firm* — Staas & Halsey LLP

(57) ABSTRACT

A device management system includes an accommodation apparatus, a network device, and a device management apparatus. The accommodation apparatus includes a plurality of storage spaces. Each of the plurality of storage spaces is capable of storing an electronic device. The network device is connected to an electronic device accommodated in the accommodation apparatus. The device management apparatus includes a processor. The processor obtains connection information when a first electronic device is newly placed in the accommodation apparatus. The connection information indicates an expected connection point in the network device. The first electronic device is to be connected to the network device at the expected connection point with a cable. The processor identifies an actual connection point at which the network device has been connected to the first electronic device with the cable. The processor determines, based on the connection information, whether the actual connection point is appropriate.

12 Claims, 11 Drawing Sheets

(51) Int. Cl.
 *G06F 11/00* (2006.01)
 *G06F 1/26* (2006.01)
 *G06F 11/22* (2006.01)

(56) References Cited

U.S. PATENT DOCUMENTS

| | | | | |
|---|---|---|---|---|
| 6,968,414 | B2* | 11/2005 | Abbondanzio et al. | 710/301 |
| 6,990,527 | B2* | 1/2006 | Spicer et al. | 709/229 |
| 8,531,983 | B2* | 9/2013 | Sokolowski | 370/252 |
| 2002/0181178 | A1* | 12/2002 | Ortiz et al. | 361/78 |
| 2003/0105904 | A1* | 6/2003 | Abbondanzio et al. | 710/302 |
| 2003/0208587 | A1* | 11/2003 | Sauer | 709/223 |
| 2005/0055587 | A1* | 3/2005 | Lee | G06F 1/28 713/300 |
| 2005/0075837 | A1 | 4/2005 | Espinoza-Ibarra et al. | |
| 2006/0190768 | A1 | 8/2006 | Kawase | |
| 2006/0236140 | A1* | 10/2006 | Tanaka | G06F 11/2015 713/300 |
| 2007/0019626 | A1* | 1/2007 | Lahiri et al. | 709/223 |
| 2007/0047195 | A1* | 3/2007 | Merkin | G06F 1/26 361/679.31 |
| 2007/0220228 | A1* | 9/2007 | Huang | 711/170 |
| 2008/0208535 | A1* | 8/2008 | Suzuki | 702/184 |
| 2008/0222732 | A1* | 9/2008 | Caldwell et al. | 726/26 |
| 2008/0263185 | A1* | 10/2008 | Anderson et al. | 709/220 |
| 2008/0265722 | A1* | 10/2008 | Saliaris | 312/223.1 |
| 2008/0319570 | A1* | 12/2008 | Van Schoiack | 700/110 |
| 2010/0042852 | A1* | 2/2010 | Yin | G06F 1/26 713/300 |
| 2012/0185579 | A1* | 7/2012 | Watanabe | 709/223 |
| 2012/0219283 | A1* | 8/2012 | Sokolowski | 398/9 |
| 2012/0303767 | A1* | 11/2012 | Renzin | 709/220 |

FOREIGN PATENT DOCUMENTS

| | | |
|---|---|---|
| JP | 2008-97650 | 4/2008 |
| JP | 2011-145827 | 7/2011 |
| WO | WO 2005/006190 A1 | 1/2005 |

* cited by examiner

| SERVER TYPE | POWER CONSUMPTION (W) | INTERNAL TEMPERATURE (°C) | STRUCTURE | COOLING DEVICE | HEIGHT (U) |
|---|---|---|---|---|---|
| ZZZ | 800 | 140 | CPU, MEMORY, I/O UNIT, ETC. | FAN | 1 |
| ... | | | | | |
| XYZ | 1100 | 145 | CPU, MEMORY, I/O UNIT, ETC. | FAN | 2 |

| RACK ID | RACK TYPE | NUMBER OF PDU'S | PDU TYPE | NUMBER OF SWITCHES | SWITCH TYPE |
|---|---|---|---|---|---|
| X | XXX | 1 | XXXY | 1 | YYY |

| SERVER ID | SERVER TYPE | PURPOSE | POSITION | HEIGHT (U) | CONNECTION PORT | BMC PORT NUMBER | BMC MAC ADDRESS | OPERATION STATUS | | | NUMBER OF NICS | NETWORK | | |
|---|---|---|---|---|---|---|---|---|---|---|---|---|---|---|
| | | | | | | | | STATE | TEMPERATURE (°C) | LOAD (%) | | MAC ADDRESS | IP ADDRESS | PORT NUMBER |
| 1 | ZZZ | CUSTOMER A | 1 | 1 | 1 | 2 | AABB | IN OPERATION | 120 | 80 | 1 | AAAA | BBBB | 1 |
| ... | | | | | | | | | | | | | | |
| N | XYZ | CUSTOMER A | 8 | 2 | 12 | 11 | AACC | TO BE PLACED | − | − | 1 | CCCC | DDDD | 12 |

DEVICE MANAGEMENT SYSTEM AND DEVICE MANAGEMENT APPARATUS

CROSS-REFERENCE TO RELATED APPLICATION

This application is based upon and claims the benefit of priority of the prior Japanese Patent Application No. 2012-068350, filed on Mar. 23, 2012, the entire contents of which are incorporated herein by reference.

FIELD

The embodiment discussed herein is related to a device management system and a device management apparatus.

BACKGROUND

An increasing number of facilities (data centers, for example) install and operate servers and other electronic devices in recent years (such a facility will be collectively referred to below as a data center). Data centers are usually assumed to be used from the outside. Accordingly, a data center is connected to the outside through a network, and all servers installed in the data center are also connected to the network. At present, several thousands to tens of thousands of servers are being operated and managed in a large-scale data center.

When many servers are to be installed, it is desirable to install more servers in a unit area. In general, therefore, an accommodation apparatus (a rack, for example), in which a plurality of servers may be accommodated, is used in the data center (such an accommodation apparatus will be collectively referred to below as a rack). A network device (referred to below as a switch) to be connected to the accommodated servers is also generally mounted in the rack.

To accept additional servers from customers or to lend additional servers to customers, for example, the data center may add servers. In general, servers have been added, that is, new servers have been installed in units of racks. By doing so, trouble due to incorrect wiring is suppressed from occurring in the network in use by servers in operation (that is, servers that are working). In other words, a situation is suppressed in which it is difficult for servers in operation to provide services. Thus, with the network in use disconnected, racks have been installed, servers have been accommodated (mounted) in the installed racks, the accommodated servers have been wired (servers, a network device, and the like have been mutually connected with cables), and other related working has been carried out. Before servers are actually connected to the network, the servers are generally tested in units of racks to confirm they will be correctly wired. Only when the wiring of the servers is confirmed to be correct in the test, the servers are connected to the network.

Installation of servers in the data center usually depends on customers. That is, the types and the number of servers accommodated in existing racks depend on requests from the customers and the background of the requests. The types and the number of servers to be accommodated in racks to be newly installed also depend on requests from customers. Thus, when servers are added in units of racks, the number of servers placed in a unit area, that is, the installation efficiency (space usage efficiency in the data center), is likely to be largely lowered. To suppress the installation efficiency from being lowered, it is desirable to install servers individually while suppressing trouble from occurring in the network in use by servers in operation.

International Publication Pamphlet No. WO 2005/006190, Japanese Laid-open Patent Publication No. 2003-303019, and Japanese Laid-open Patent Publication No. 2008-97650 disclose related techniques.

SUMMARY

According to an aspect of the present invention, provided is a device management system including an accommodation apparatus, a network device, and a device management apparatus. The accommodation apparatus includes a plurality of storage spaces. Each of the plurality of storage spaces is capable of storing an electronic device. The network device is connected to an electronic device accommodated in the accommodation apparatus. The device management apparatus includes a processor. The processor obtains connection information when a first electronic device is newly placed in the accommodation apparatus. The connection information indicates an expected connection point in the network device. The first electronic device is to be connected to the network device at the expected connection point with a cable. The processor identifies an actual connection point at which the network device has been connected to the first electronic device with the cable. The processor determines, based on the connection information, whether the actual connection point is appropriate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of contents of a server information database;

FIG. 7 illustrates an example of contents of a placement management information database;

DESCRIPTION OF EMBODIMENT

An embodiment will be described in detail with reference to the drawings.

Figure 1:
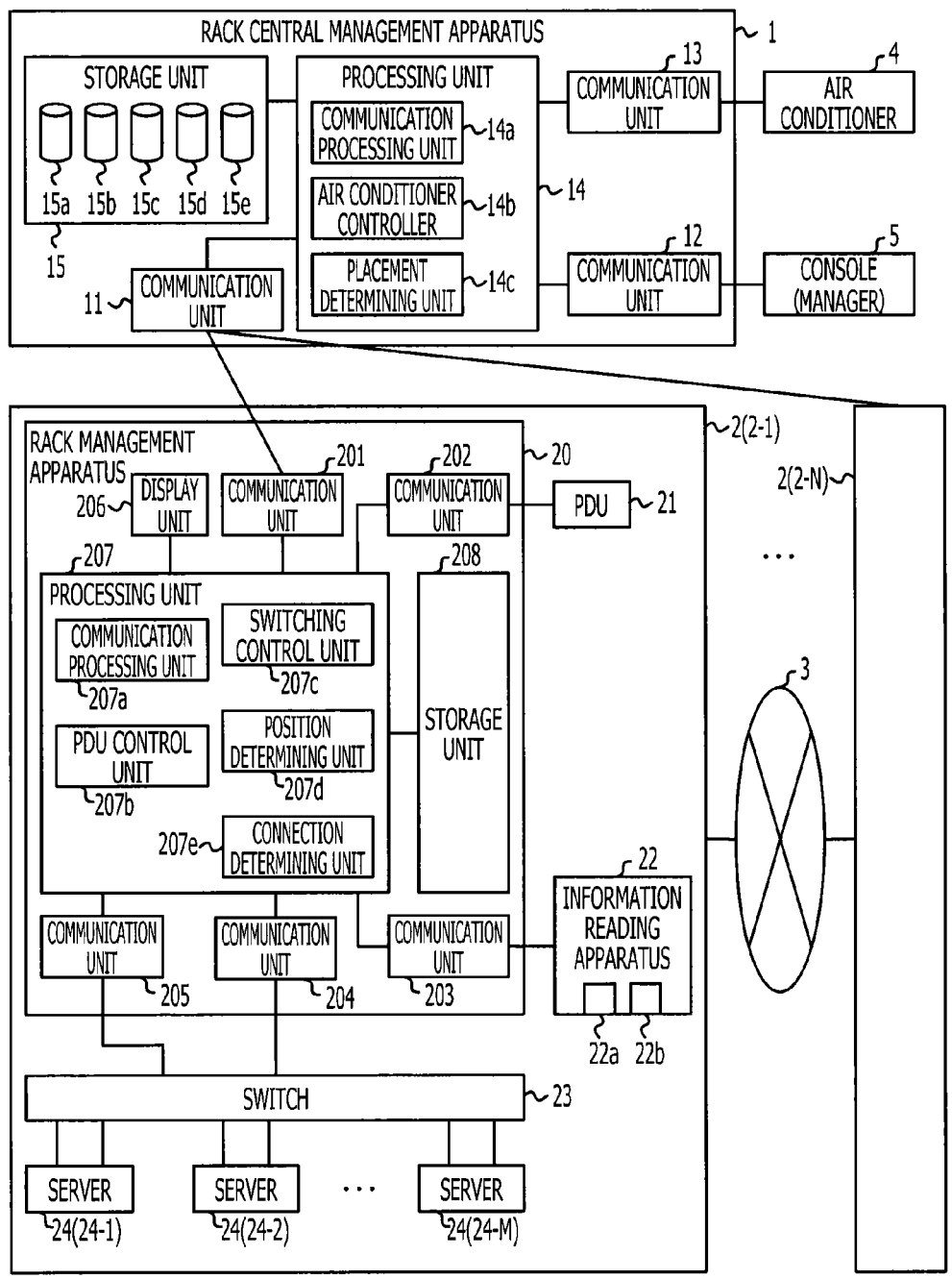
FIG. 1 illustrates an example of a structure of a device management system in this embodiment.

FIG. 1 illustrates an example of a structure of a device management system in this embodiment.

A device management system in this embodiment is constructed in a facility (data center) in which many servers are installed. The device management system uses the servers to provide services. As illustrated in FIG. 1, the device management system includes a rack central management apparatus 1, a plurality of racks 2 (2-1 to 2-N), a network 3, an air conditioner 4, and a console 5.

Each rack 2 includes a rack management apparatus 20, a power distribution unit (PDU) 21, an information reading apparatus 22, and a switch 23. The information reading apparatus 22 may accommodate (mount) a plurality of servers 24 (24-1 to 24-M). The rack management apparatus 20 in each rack 2 is connected to the rack central management apparatus 1 through, for example, a dedicated line.

The switch 23 is a network device connected to the network 3, which is, for example, a local area network (LAN), installed in the data center. Each server 24 and the rack management apparatus 20, which are accommodated in the rack 2, are connected to the switch 23. Thus, the switch 23 enables data transfer, for example, among servers 24 mounted in the rack 2 and between a particular server 24 and the network 3.

Although, in FIG. 1, the servers 24 are represented as electronic devices mounted in the rack 2, each electronic device may be a router or another network device (communication device) such as a hub. Alternatively, the electronic device may be a disk array in which a plurality of hard disk drives (HDDs), for example, are mounted. Accordingly, the types of electronic devices to be mounted in the rack 2 and processing performed by these electronic devices are not limited to the type of server 24 or a similar device and processing performed by it. In this embodiment, however, to suppress confusion, only the server 24 is assumed as the electronic device.

The rack management apparatus 20 described above manages operations of the devices mounted in the rack 2, which are the servers 24, PDU 21, information reading apparatus 22, and switch 23. The rack management apparatus 20 in each rack 2 is connected to the rack central management apparatus 1 through a dedicated line. Accordingly the rack management apparatus 20 in each rack 2 manages the mounted devices in accordance with instructions from the rack central management apparatus 1.

When an electronic device becomes hot, the electronic device is likely to malfunction or cause a failure. The temperature of the electronic device also affects lifetime of the electronic device. Accordingly, each server 24 measures its internal temperature and notifies the rack management apparatus 20 of the measured temperature.

Figure 5:
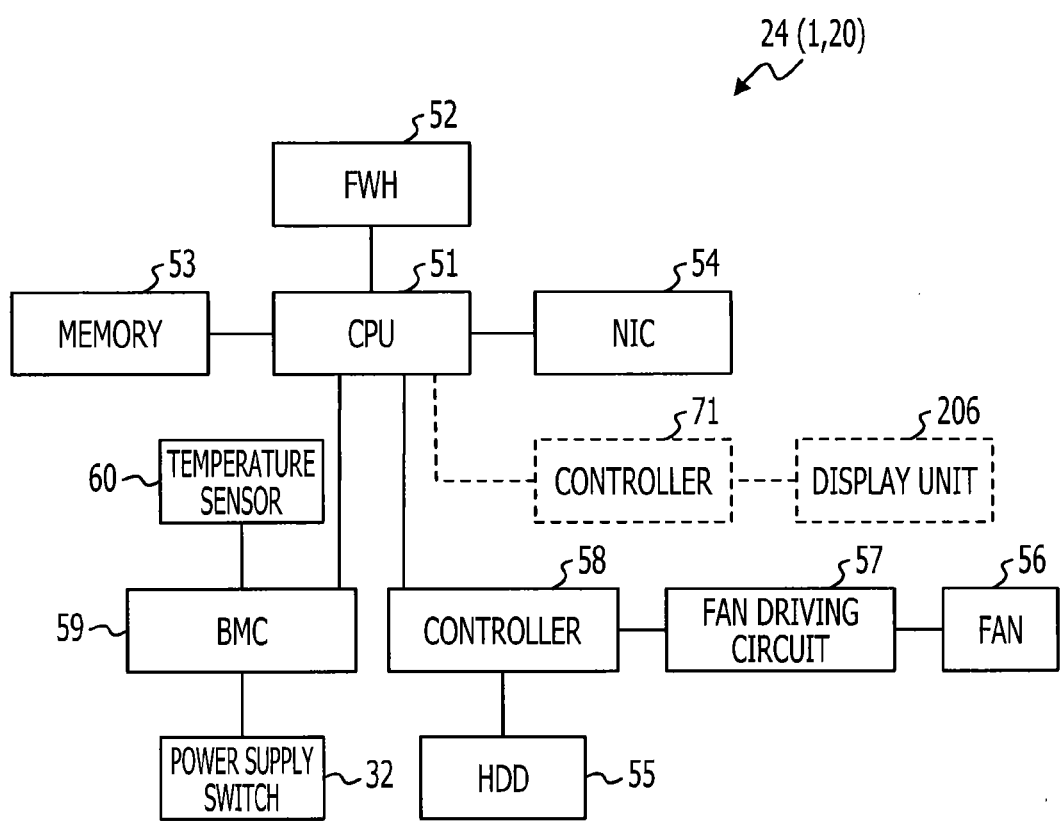
FIG. 5 illustrates an example of a structure of a server.

The FIG. 5 illustrates an example of a structure of the server 24. The server 24 includes, for example, a central processing unit (CPU) 51, a firmware hub (FWH) 52, a memory (memory module) 53, a network interface card (NIC) 54, a hard disk drive (HDD) 55, a fan 56, a fan driving circuit 57, a controller 58, a baseboard management controller (BMC) 59, a temperature sensor 60, and a power supply switch 32, as illustrated in FIG. 5. This structure is only an example, and the structure of the server 24 is not limited to this structure.

The FWH 52 is a memory that stores a basic input/output system (BIOS). The CPU 51 reads the BIOS into the memory 53 and executes the BIOS. The HDD 55 stores an operating system (OS) and various types of application programs. After the BIOS has been activated, the CPU 51 may read the OS from the HDD 55 through the controller 58 and may execute the OS. Communication through the NIC 54 becomes possible after the BIOS has been activated.

The BMC 59 is an apparatus used to manage the server 24. The BMC 59 has communication functions, so it may communicate with the rack management apparatus 20 through the switch 23. Therefore, the BMC 59 may control the server 24 in which the BMC 59 is included so as to start and stop the server 24, that is, may control the power supply so as to turn on and off the server 24, in accordance with instructions from the rack management apparatus 20. The BMC 59 turns on and off the power supply in response to operations performed for the power supply switch 32. The BMC 59 notifies the rack management apparatus 20 of internal temperature measured by the temperature sensor 60, in accordance with an instruction from the rack management apparatus 20 or in accordance with a predetermined setting.

The rack central management apparatus 1 manages the entire device management system (data center). The rack central management apparatus 1 uses the temperatures of the servers 24 in each rack 2, which are notified by the rack management apparatus 20 in the rack 2, in control of the air conditioner 4. Thus, the rack central management apparatus 1 adjusts the temperature in the data center so that all installed servers 24 operate normally.

The rack central management apparatus 1 includes three communication units 11 to 13, a processing unit 14, and a storage unit 15, as illustrated in FIG. 1.

The communication unit 11 enables communication with the rack management apparatus 20 in each rack 2. The communication unit 12 enables communication with the console 5. The communication unit 13 enables communication with the air conditioner 4.

The processing unit 14 performs processing corresponding to communication that has been performed by the communication units 11 to 13. The storage unit 15 stores data to be used by the processing unit 14 to execute processing and also stores data generated as a result of the processing.

The processing unit 14 functions as a communication processing unit 14a, an air conditioner controller 14b, and a placement determining unit 14c, as illustrated in FIG. 1.

The communication processing unit 14a performs processing so that communication is enabled through the communication units 11 to 13. The air conditioner controller 14b controls the air conditioner 4 in accordance with the temperatures of the servers 24, which have been notified by the rack management apparatus 20 in each rack 2. Thus, the air conditioner controller 14b adjusts the temperature in the data center so that all servers 24 operate stably.

As described above, to accept additional servers from customers or to lend additional servers to customers, for example, the data center may add servers. When installing a new server, the data center desirably performs provisioning so that services in which the new server is used may be provided. In the provisioning, a place (a position) in which the new server is placed is determined. The placement determining unit 14c determines an appropriate place in which the server 24 is newly placed due to, for example, additional installation.

The place in which the server 24 is placed is determined as described below. The method of determining a place in which the server 24 is placed will be specifically described with reference to FIG. 11.

Figure 11:
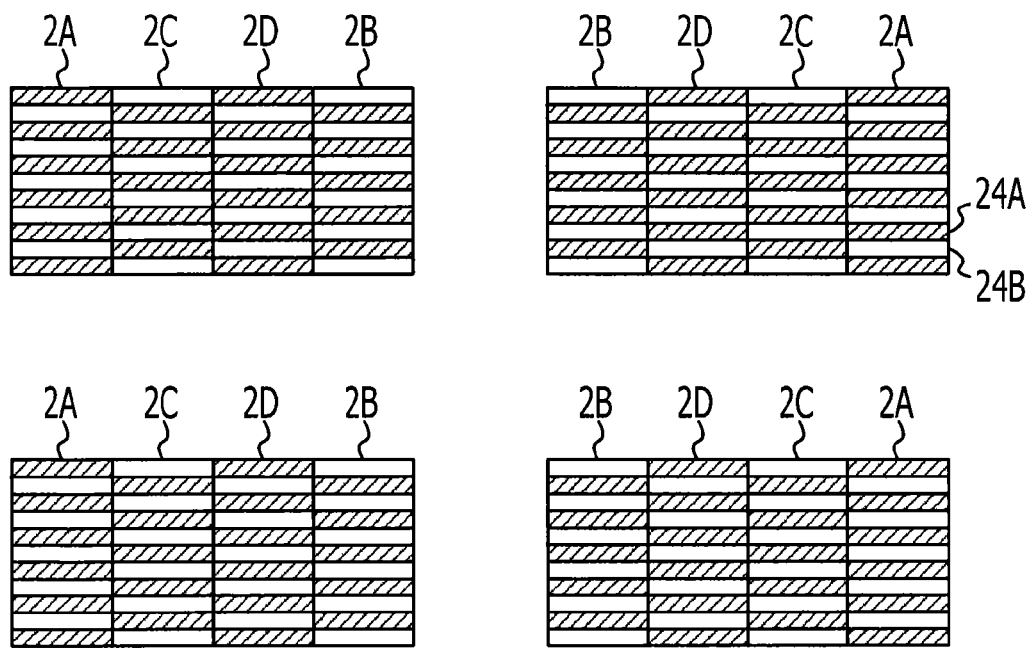
FIG. 11 illustrates a method of determining placement of servers in this embodiment.

In FIG. 11, each rack 2 is represented as any one of racks 2A to 2D, and each server 24 is represented as a server 24A or 24B. FIG. 11 illustrates the places of the servers 24A and 24B in each of the racks 2A to 2D in an arrangement in which four rack groups, each of which includes four racks 2A to 2D placed side by side, are spaced.

Various types of servers 24 may be mounted in the rack 2. The height of the server 24 varies depending on the type of the server 24. The height is the vertical length of the server 24 accommodated in the rack 2. Unless otherwise noted in the descriptions below, the term height will refer to the vertical length of the server 24. In general, the height of the server 24 that may be accommodated in the rack 2 is defined in the unit U (an abbreviation of "unit"). The heights of many types of servers 24 are 1 to 4 U.

The two types of servers 24A and 24B in FIG. 11 have been classified in consideration of an influence by the ambient temperature. In this embodiment, this classification focuses on the internal temperature for the reason described below, for example.

Servers have been more integrated in recent years, and electric power consumed by these servers has been increased due to the integration. At present, therefore, the cooling of the server is a very important issue. A cooling device such as a fan is a part indispensable to the servers.

Air is used as a medium used by a fan to cool parts. In general, a server in which a fan is mounted as a cooling device is structured so that cold air is inhaled from an opening formed in the front surface of the case into the inside of the case. The air becomes hot due to a heat transfer, and the hot air is exhaled from the rear surface of the case.

Particularly, a server with a low height has a small space that may be obtained in the case. The smaller the space is, the more difficult it is to obtain air used to cool parts, and the more difficult it is to obtain an appropriate air flow. Therefore, the lower the server is, the more likely its internal temperature to become high. This indicates that the temperature in the server does not necessarily depend on the power consumption of the server, types of parts mounted in the server, the number of parts mounted in the server, and other factors.

The internal temperature of the server changes depending on the temperature of air to be inhaled and the flow rate of the air. The internal temperature is also affected by the amount of heat transferred through the surround of the server and the case. This is because, if there is a heating element (another server) in the vicinity of the server, the temperature of air between the heating element and the server is raised by heat dissipation from the heating element. When the temperature of the air is raised, the temperature of a portion, in contact with the air, of the case is raised, so the amount of heat transferred to the cold air inhaled into the server is increased and the amount of heat removed by the cold air is thereby reduced. Thus, the internal temperature of the server changes depending on its placement, that is, whether there is a heating element (another server) in the vicinity.

An upper limit is set for the internal temperature of the server. When there is a heating element in the vicinity of the server, the internal temperature of the server changes (is raised), so the internal temperature (more precisely, a difference between the internal temperature and its upper limit) may be taken as an index that represents the amount of margin for the heat generated by the server or as a measure for the amount of margin. Thus, in this embodiment, the internal temperature of the server is used as an index that represents a degree of influence by the ambient temperature. The internal temperature is a temperature obtained when the server is operated under a fixed condition, that is, when the server is operated in a room at a predetermined temperature. A simulation result in thermal analysis or a result in test carried out in the course of commercialization may be used as this internal temperature.

The servers 24A and 24B in FIG. 11 have been classified by evaluating the degree of influence by the ambient temperature at two levels on the basis of the above-described internal temperature of the server 24. For example, the server 24A is a server 24 that has been regarded as having a high degree of influence (high internal temperature), and the server 24B is a server 24 that has been regarded as having a low degree of influence (low internal temperature). The degree of influence may be evaluated at three levels or more instead of two levels.

The servers 24A and 24B accommodated in the racks 2A to 2D as in FIG. 11 are placed, assuming that the cold air supplied from the air conditioner 4 upwardly flows from below the floor. The racks 2A to 2D are assumed to be of the type in which air flows horizontally (that is, in the direction in which the racks 2A to 2D are placed side by side), that is, of the type in which there is no partition on a side plane.

Air that has become hot as a result of a heat transfer has a low density, so a force to raise the air is exerted on the air. Therefore, the servers 24 accommodated in the rack 2 are most affected by heat dissipated from the adjacent servers 24 below the servers 24. The internal temperature (temperature of parts) of the server 24 is largely affected by the temperature rise of the air, which is caused by a transfer of heat to the air inhaled into the server 24. In general, therefore, the temperature of the case of the server 24 has a correlation with the internal temperature of the server 24. In this embodiment, therefore, servers 24A and servers 24B are alternately placed vertically in the rack 2, as illustrated in FIG. 11. When the degree of influence is evaluated at three levels, in which case a server 24 having a lower degree of influence than the server 24B is represented as a server 24C, the servers 24A to 24C are accommodated in the rack 2 so that a server 24A, a server 24B, a server 24C, and a server 24A are upwardly placed in that order from the bottom.

As for the rack 2 of the type in which there is no partition on a side plane, part of the air that has become hot due to heat dissipated from the server 24 flows into the adjacent rack 2. Therefore, it is desirable to place servers 24 in each rack 2 in consideration of the placement of the servers 24 in adjacent racks 2. Thus, in this embodiment, servers 24 that have the same degree of influence are not placed side by side, in adjacent racks 2, at the same level as illustrated in FIG. 11.

As for the rack 2 of the type in which there is a partition on a side plane, part of the air that has become hot due to heat dissipated from the server 24 does not flow into the adjacent rack 2. The temperature of the partition itself is even over almost the entire partition due to the characteristics of the material of the partition. In each rack 2, therefore, the servers 24 are accommodated so that a server 24A, a server 24B, and a server 24A are upwardly placed in that order from the bottom. The reason why the server 24A is placed at the bottom is that, assuming that cold air is supplied from below the floor, the closer to the floor the position is, the lower the temperature of the air to be taken into the server 24 may be expected to be.

As described above, in this embodiment, a relationship in the order of the degree of influence assigned to the server 24 is set as a condition, and a new server 24 to be installed is placed in a rack 2 that may accommodate the server 24 at a position at which the order relationship is satisfied. When a place in which server 24 is placed is determined while the order relationship is satisfied, the amount of heat dissipated from some servers 24 is reduced and thereby hot spots, at which the internal temperature is very higher than other servers 24, may be suppressed. When hot spots are suppressed, the cooling load in the data center is lowered and cooling costs may be reduced. Accordingly, the placement determining unit 14c identifies a rack 2 in which a new server 24 may be accommodated so that its order relationship is satisfied and determines the place in which the new server 24 is placed.

Even if the four racks 2A to 2D illustrated in FIG. 11 are all of the same type, a different amount of heat flows from the adjacent rack 2 to the racks 2A to 2D. The amount of heat flows into the rack 2D is largest, followed by the rack 2C, rack 2B, and rack 2A in that order. In FIG. 11, therefore, any one of reference characters "2A" to "2D" is assigned to the rack 2 in accordance with the amount of heat that flows from the adjacent rack 2.

In the determination of a place in which the server 24 is placed, it is desirable to consider the amount of heat, which differs depending on the rack 2, flowing from another rack 2. Thus, noting the amount of additional options, the value of a predicted load, or another factor even among servers 24 of the same type, a server 24 which is predicted to have a low internal temperature may be accommodated in a rack 2 into which a large amount of heat flows. That is, servers 24 that are classified as servers 24A of the same type may be further classified depending on the actual hardware structure or the value of a predicted load and the classification result may be reflected in the determination of a place in which the server 24 is placed.

The placement determining unit 14c determines a place in which the server 24 is placed with reference to data stored in the storage unit 15. The storage unit 15 stores a server information database (DB) 15a, a device information DB 15b, a placement management information DB 15c, an execution condition information DB 15d, and a boundary condition DB 15e, as data to be referenced by the placement determining unit 14c.

In the server information DB 15a, information related to servers 24 is collected for each type of server 24. Information related to servers 24 includes, for example, server type information, power consumption information (W), internal temperature information (° C.), structure information, cooling device information, and height information (U), as illustrated in FIG. 6.

The server type information represents the type of server 24. "ZZZ" and "XYZ" in FIG. 6 represent identifiers (IDs) that each identifies the type of server 24. The power consumption information represents the value of the maximum power consumption of the server 24. The internal temperature information represents the internal temperature measured when the server 24 is operated under a predetermined condition. The structure information represents the types of parts mounted in the server 24 and their combination. Parts mounted in the server 24 include a CPU, a memory, an input/output (I/O) unit including a storage unit such as an HDD, and a NIC.

The cooling device information represents the cooling device mounted in the server 24. "FAN" in FIG. 6 indicates that a fan is mounted as the cooling device. The height information represents the height of the server 24 in U units. The numerals 1 and 2 in FIG. 6 respectively indicate that height of the server 24 is 1 U and 2 U.

The device information DB 15b is a DB in which information related to the rack 2 and devices, other than the server 24, mounted in the rack 2 is collected. The devices mounted in the rack 2 include the PDU 21 and switch 23.

The rack 2 has a plurality of stages on which servers 24 with a size of 1 U may be accommodated. The number of stages varies depending on the type of rack 2. In addition to the servers 24, at least one PDU 21 and at least one switch 23 are mounted in the rack 2. In the device information DB 15b, therefore, identification information that represents the type of rack 2, the number of PDUs 21 to be mounted, identification information (referred to below as the PDU type information) that identifies these PDUs 21, the number of switches 23 to be mounted, and identification information (referred to below as the switch type information) that identifies these switches 23 are stored, as information related to the rack 2 for each type of rack 2, for example.

The PDU 21 supplies electric power to the servers 24 mounted in the rack 2. Specifically, the PDU 21 receives alternating current (AC) electric power, converts the received AC electric power to direct current (DC) electric power, and outputs the converted DC electric power.

Figure 4:
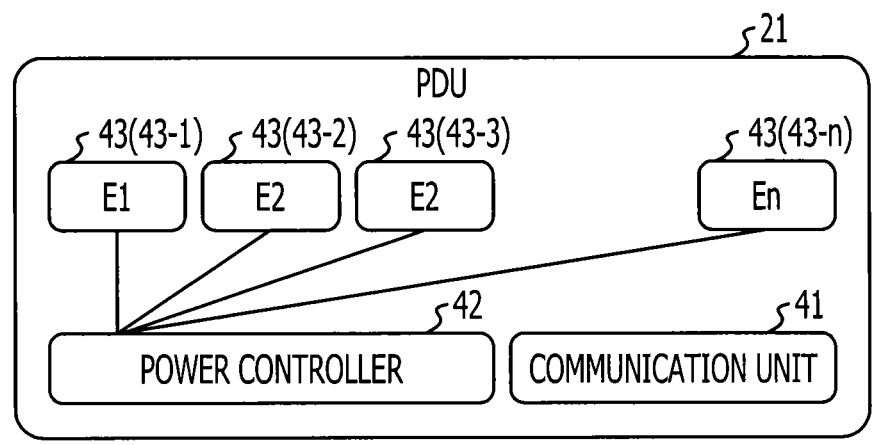
FIG. 4 illustrates an example of a structure of a power distribution unit (PDU)

FIG. 4 illustrates an example of a structure of the PDU 21. As illustrated in FIG. 4, the PDU 21 includes a communication unit 41, a power controller 42, and a plurality of power supply connection ports 43 (43-1 to 43-n).

In the structure illustrated in FIG. 1, the communication unit 41 enables communication with the rack management apparatus 20. The power controller 42 controls power supply from each power supply connection port 43. Thus, the PDU 21 may supply electric power by an amount that is desirably supplied from a power supply connection port 43 from which electric power is desirably supplied, in accordance with an instruction from the rack management apparatus 20.

As information related to the PDU 21 described above, PDU type information and the number of connection ports provided on the PDU 21 are stored in the device information DB 15b for each type of PDU 21, for example. The switch 23 has a plurality of ports to which communication cables (not illustrated) are connected. Thus, as information related to the switch 23, switch type information and the number of ports provided on the switch 23 are stored in the device information DB 15b for each type of switch 23, for example.

The placement management information DB 15c is a DB in which information related to the servers 24, which are accommodated in the rack 2 or to be newly accommodated in the rack 2, is collected for each rack 2.

FIG. 7 illustrates an example of contents of information stored in the placement management information DB 15c. The example of the contents in FIG. 7 is information stored for one rack 2. The information may be divided into information related to the rack 2 and information related to the servers 24 accommodated in the rack 2.

As the information related to the rack 2, a rack ID, a rack type, the number of PDUs 21, a PDU type, the number of switches 23, and a switch type are stored in the placement management information DB 15c.

The rack ID information uniquely identifies the rack 2. "X" in FIG. 7 represents an ID number assigned to the rack 2. Other information items, which are the rack type, the number of PDUs 21, the PDU type, the number of switches 23 and the switch type, are acquired from the device information DB 15b described above.

As the information related to the server 24, a server ID, a server type, a purpose, a position, a height (U), a connection port, a BMC port number, a BMC media access control (MAC) address, an operation status, the number of NICs, and a network are stored in the placement management information DB 15c. Placement management information for one server 24 is a collection of these information items. Of these information items, the server type, the height (U), the number of NICs may be acquired from the server information DB 15a described above. The number of NICs may be obtained by referencing the structure information. Therefore, a description of these information items will be omitted.

The server ID information uniquely identifies the server 24. The numeral 1 in FIG. 7 represents an ID number assigned to the server 24. The purpose information includes customer information representing a customer who uses the server 24. "CUSTOMER A" in FIG. 7 indicates one customer. Therefore, FIG. 7 indicates that the server 24 having a server ID of 1 and the server 24 having a server ID of N are used by the same customer.

The positional information indicates a position in the rack 2 in which a server 24 has been accommodated or is to be accommodated. The numeral 1 in FIG. 7 indicates a first stage, which is the lowest stage in the rack 2. The numeral 8 in FIG. 7 indicates an eighth stage from the bottom of the rack 2. Since there is a server 24 having a height of 2 U or more, the positional information in this embodiment indicates the lowest stage. Thus, the server 24, identified by a server ID of N, with a height of 2 U is accommodated in a space including the eighth stage and a ninth stage in the rack 2.

The connection port information indicates the power supply connection port 43, of the PDU 21, to which the power cable of the relevant server 24 has been connected or is to be connected. This embodiment assumes that the rack management apparatus 20 and the BMC 59 in the server 24 mutually communicate through the switch 23. The BMC port number information indicates the number of the port, of the switch 23, to which the relevant BMC 59 is to be connected. The BMC MAC address information indicates the MAC address assigned to the BMC 59.

The operation status information includes state information, temperature information, and load information. The state information indicates the current state of the server 24. "IN OPERATION" in FIG. 7 indicates that the relevant server 24 is in operation and "TO BE PLACED" indicates that a new server 24 is to be installed.

The temperature information and load information indicate the status of an already accommodated server 24. For a new server 24 yet to be installed, therefore, the temperature information and load information are not stored. The temperature information and load information are updated at predetermined timings. In control of the air conditioner 4, the temperature information stored in the placement management information DB 15*c* for each server 24 is referenced.

The network information is prepared for each NIC 54 that has been mounted or to be mounted in the server 24. The network information includes MAC address information, internet protocol (IP) address information, and port number information. The port number information indicates the port, of the switch 23, to which the NIC 54 in the relevant server 24 has been connected or is to be connected through a communication cable.

The placement determining unit 14*c* may indentify the types of servers 24 stored in each rack 2, their positions, and the number of servers 24 in the rack 2 by referencing the placement management information DB 15*c* in which the above information is stored for each rack 2. When a new server 24 is to be placed, therefore, the placement determining unit 14*c* may identify a rack 2, which may satisfy the order relationship illustrated in FIG. 11, and a position in the rack 2 as a place in which the server 24 is placed.

The information indicating the placement of the racks 2 is stored in, for example, the storage unit 15 in the form of a DB (rack placement information DB), which is not illustrated in FIG. 1.

When installing new servers 24, the manager enters, for each server 24, the server ID information, server type information, structure information, purpose information, and network information into the console 5. The manager enters the network information for each NIC 54, but does not enter information related to connection such as the BMC port number information and the port number information in each of network information. The placement determining unit 14*c* determines a place for each server 24 with reference to the placement management information DB 15*c*, and stores information related to the server 24 in the placement management information DB 15*c*.

The record (entry) in FIG. 7 in which N is indicated as the server ID includes information items stored as described above. Accordingly, the state information in the operation status information is "TO BE PLACED". As indicated by the record, in this embodiment, a power supply connection port 43, of the PDU 21, to which to connect the power cable and a port, of the switch 23, to which to connect the communication cable are also determined besides the position at which to accommodate the server 24.

The execution condition information DB 15*d* stores model data of a rack 2 and a server 24 that will be used in the execution of a simulation.

In general, a data center is thermally designed so that the intake-air temperature is maintained at or below a predetermined limit. When many servers 24 are simply installed, hot spots described above are highly likely to occur due to, for example, variations in the intake-air temperature or the amount of inflow or outflow heat, that is, internal temperature is highly likely to be easily raised in some servers 24 as compared with other servers 24. Therefore, an entire data center is usually simulated before a device management system as illustrated in FIG. 1 is actually constructed. This indicates that a new data center is constructed for additional installation in most cases.

In an example of a possible simulation method, each rack 2 is modeled separately from the room interior of the data center, the amount of air and heat that flows between the rack 2 and the room interior is calculated, and calculation results are reflected in an air temperature distribution and an air flow speed distribution in the room interior. In this method, the room interior may be handled as the boundary condition in the simulation of the rack 2 and the rack 2 may be handled as the boundary condition in the simulation of the room interior. Thus, in this embodiment, boundary condition information representing the boundary condition of the room interior is saved for each rack 2. The boundary condition DB 15*e* stores the boundary condition information for each rack 2.

When servers 24 are placed as illustrated in FIG. 11, it becomes possible to suppress hot spots. When a new server 24 is placed in a rack 2, however, a hot spot may be generated in the rack 2 as the result of having placed the server 24. To solve this problem, in this embodiment, the boundary condition information stored in the boundary condition DB 15*e* is used to perform a simulation for a rack 2 selected as a place in which a new server 24 is placed and whether the rack 2 is appropriate as an installation place is confirmed. Thus, the placement determining unit 14*c* finally determines, as the place in which the new server 24 is placed, the rack 2 confirmed to be appropriate through the simulation.

If the number of new servers 24 to be installed is not so large as compared with the number of already installed servers 24, even when these new servers 24 are installed, the room temperature in the data center is only slightly raised. To maintain the room temperature at a fixed level, it is desirable to remove heat that has been generated as a result of installing the new servers 24. The air conditioner 4 is controlled so as to further remove the additional heat. Accordingly, the above boundary condition may be regarded as representing a condition in a steady state. Even in a simulation in which the boundary information is used, therefore, it is thought that the state of the rack 2 in which to accommodate the new servers 24 may be highly precisely identified. Since this simulation is performed for each rack 2, the amount of calculation may be significantly reduced as compared with a simulation of the entire data center. This is also advantageous in that new servers 24 may be quickly placed.

In the simulation targeted at the rack 2, the internal space of the rack 2 is divided and the amount of inflow and outflow heat is calculated between the server 24 and air in each divided space. The temperature of air in the space in contact with the newly accommodated server 24 is raised by heat dissipated from the new server 24. This raises the internal temperatures of already accommodated servers 24.

There is no particular limitation on the hardware structure of the rack central management apparatus 1 that stores the server information DB 15a, device information DB 15b, placement management information DB 15c, execution condition information DB 15d, and boundary condition DB 15e, described above, in the storage unit 15. For convenience, therefore, the rack central management apparatus 1 is assumed to have a hardware structure as illustrated in FIG. 5 and the reference numerals used in the hardware structure will be used.

When the rack central management apparatus 1 has a hardware structure as illustrated in FIG. 5, the storage unit 15 corresponds to the HDD 55. The communication unit 11 is implemented by, for example, the BMC 59. The communication units 12 and 13 are implemented by, for example, the NIC 54. The processing unit 14 is implemented when the CPU 51 executes the BIOS stored in the FWH 52 and a plurality of programs stored in the HDD 55. The plurality of programs include the OS, an application program for controlling the air conditioner 4, an application program (referred to below as a placement determining program) for determining a position at which a new server 24 is placed, and a program (referred to below as simulation software) for simulation. The rack 2 is thermally analyzed by executing the simulation software during the execution of the placement determining program. Thus, the processing unit 14 is implemented by the CPU 51, FWH 52, memory 53, HDD 55, and controller 58.

Figure 10:
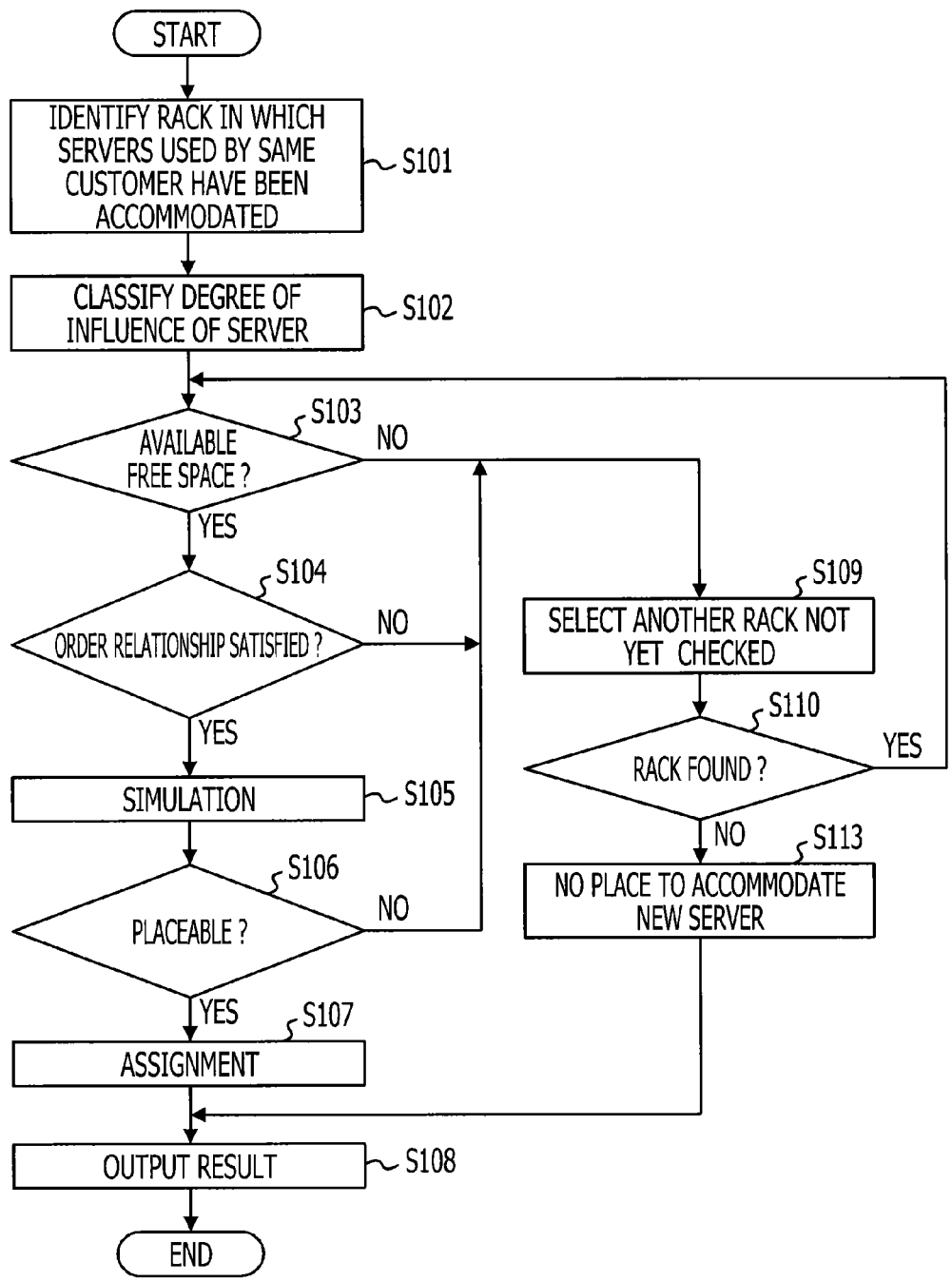
FIG. 10 is a flowchart for placement determination processing.

FIG. 10 is a flowchart for placement determination processing. This placement determination processing is implemented when the CPU 51 executes the above placement determining program. The placement determination processing will be described below in detail with reference to FIG. 10.

As described above, when placing new servers 24, the manager enters the server ID information, server type information, structure information, purpose information, and the network information other than the port number information into the console 5, for each server 24. After these information items have been entered, the placement determination processing is executed when the manager instructs to execute determination of placement of the servers 24. FIG. 10 represents a flow of processing in which the place of one server 24 is determined.

First, the CPU 51 references the placement management information DB 15c by using the entered purpose information and identifies a rack 2 in which a server 24 used by the customer indicated in the purpose information have been accommodated (S101). The reason why the rack 2 is identified as described above is to preferentially accommodate servers 24 used by the same customer in the same rack 2.

Next, the CPU 51 extracts, by using the server type information entered by the manager, the relevant internal temperature information from the server information DB 15a, evaluates the new server 24 on the basis of the extracted internal temperature information and entered structure information, and classifies a degree of influence of the new server 24 (S102). The CPU 51 then references the server information DB 15a, device information DB 15b, and placement management information DB 15c to determine whether the identified rack 2 has an available free space enough to accommodate the new server 24 (S103). When there is no such a free space, the determination result in S103 is No and the sequence proceeds to S109. When there is such a free space, the determination result in S103 is Yes and the sequence proceeds to S104.

In S104, the CPU 51 determines whether the classified degree of influence and the degrees of influence of servers 24 present around the available free space satisfy the order relationship illustrated in FIG. 11. A case in which the server 24 may be accommodated apart from existing servers 24 is also included in this processing. When the order relationship is satisfied, the determination result in S104 is Yes and the sequence proceeds to S105. When the order relationship is not satisfied, the determination result in S104 is No and the sequence proceeds to S109.

In S105, the CPU 51 references the execution condition information DB 15d and boundary condition DB 15e to perform a simulation for thermal analysis targeted at the identified rack 2. The CPU 51 then references results in thermal analysis to determine whether the new server 24 may be placed, that is, whether a thermal problem is caused in the newly placed server 24 or in any server 24 in the vicinity of the new server 24 as a result of placing the new server 24 (S106). When this thermal problem is highly likely to occur, the determination result in S106 is No and the sequence proceeds to S109. When it may be said that this thermal problem will not occur, the determination result in S106 is Yes and the sequence proceeds to S107.

In S107, the CPU 51 references the device information DB 15b and placement management information DB 15c to assign a power supply connection port 43 of the PDU 21 and ports of the switch 23 to which to connect the new server 24. At least two ports of the switch 23 are assigned to connect the new server 24 to the BMC 59 and NIC 54. The CPU 51 then outputs, to the console 5, a placement determination result, that is, placement management information that indicates the rack 2 in which to accommodate the new server 24, the position at which the new server 24 is placed, the assigned power supply connection port 43 of the PDU 21, and the assigned ports of the switch 23. When the manager manipulates the console 5 to accept the placement determination result, the CPU 51 stores the placement management information in the placement management information DB 15c and sends the placement management information to the rack management apparatus 20 of the relevant rack 2 (S108). This completes the placement management processing.

In S109 to which the sequence proceeds when at least any one of the results in S103, S104, and S106 is No, the CPU 51 selects another rack 2 that is not yet checked. The CPU 51 preferentially selects another rack 2 in which a server 24 used by the customer have been accommodated. The CPU 51 then determines whether there is a rack 2 that is not yet checked (S110). When there is such a rack 2, the determination result in S110 is Yes and the sequence returns to S103 above, in which case subsequent processing is executed in a similar way. When there is no such a rack 2, the determination result in S110 is No and the sequence proceeds to S113.

The CPU 51 then determines that there is no place to accommodate the new server 24 unless a new rack 2 is installed (S113) and outputs the result (S108).

In this embodiment, a rack 2 that may accommodate the new server 24 is confirmed in this way without adding a rack 2.

When the CPU 51 executes the placement determination processing described above, the placement determining unit 14c determines a place in which the new server 24 is placed. The determination result is stored in the placement management information DB 15c as placement management information. The placement management information stored in the placement management information DB 15c is also sent to the rack management apparatus 20 in the relevant rack 2.

The rack management apparatus 20 stores placement management information about the rack 2 in which the rack management apparatus 20 is mounted and uses the placement management information in the management of the servers 24 accommodated in the rack 2. When a server 24 is accommodated at the position indicated in the positional information in newly received placement management information, the rack management apparatus 20 checks, by using the placement management information, whether the new server 24 has been appropriately placed.

For this check, three determinations are made to see whether a server 24 of the type indicated in the server type information has been accommodated at the position indicated in the positional information, whether a power cable has been connected to the power supply connection port 43, of the PDU 21, indicated in the connection port information, and whether the NIC 54 corresponding to the port, of the switch 23, indicated by the port number information in the network information has been connected. Through these three determinations, it may be confirmed that the new server 24 has been appropriately placed and the relevant cables have been appropriately connected.

If it is confirmed that the new server 24 has been appropriately placed and the relevant cables have been appropriately connected, it becomes possible to suppress the rack 2 in which the new server 24 is accommodated from being disconnected from the network 3. It is also possible to suppress the operation of the switch 23 connected to the network 3 from being stopped. Thus, in this embodiment, when a new server 24 is to be accommodated in a rack 2, existing servers 24 in the rack 2 are not stopped. That is, in this embodiment, a new server 24 may be placed without even part of the device management system being stopped. Accordingly, this embodiment may improve the placement efficiency by accommodating servers 24 individually in a rack 2, and may also suppress a drop in the processing efficiency that would be caused when existing servers 24 or the network 3 is stopped.

The rack management apparatus 20 includes five communication units 201 to 205, a display unit 206, a processing unit 207, and a storage unit 208 as illustrated in FIG. 1. The processing unit 207 functions as a communication processing unit 207a, a PDU control unit 207b, a switching control unit 207c, a position determining unit 207d, and a connection determining unit 207e.

The communication unit 201 enables communication with the rack central management apparatus 1. The communication unit 202 enables communication with the PDU 21. The communication unit 203 enables communication with the information reading apparatus 22. The communication unit 204 enables communication with the switch 23. The communication unit 204 is mainly used to control the switch 23. The communication unit 205 is used for communication with the BMC 59 in each server 24.

The communication processing unit 207a performs processing used to enable communication through the communication units 201 to 205. The PDU control unit 207b performs processing involved in control of the PDU 21. The switching control unit 207c performs processing involved in control of the switch 23. The position determining unit 207d determines the position at which the new server 24 has been accommodated in the rack 2. The connection determining unit 207e determines places at which the new server 24 is connected with the relevant cables.

The storage unit 208 is used to store placement management information received from the rack central management apparatus 1. Temperature reported from the BMC 59 in each server 24 is entered through the switch 23 and communication unit 205 into the processing unit 207, and is stored in the storage unit 208 as temperature information in the operation status information included in the relevant placement management information DB.

There is no particular limitation on the hardware structure of the rack management apparatus 20 described above. Therefore, as with the rack central management apparatus 1, the rack management apparatus 20 is assumed to have a hardware structure as illustrated in FIG. 5 and the reference numerals used in the hardware structure will be used. Unlike the rack central management apparatus 1 and server 24, the rack management apparatus 20 has the display unit 206 and a controller 71 that controls display processing of the display unit 206 in accordance with an instruction from the CPU 51. The display unit 206 and controller 71 are enclosed by dashed lines in FIG. 5.

When the rack management apparatus 20 has a hardware structure as illustrated in FIG. 5, the storage unit 208 corresponds to the HDD 55. The communication units 201 to 203 and 205 may be all implemented by, for example, the BMC 59. In this case, the communication unit 204 may be implemented by the NIC 54. The processing unit 207 is implemented when the CPU 51 executes the BIOS stored in the FWH 52 and a plurality of programs stored in the HDD 55. The plurality of programs include the OS and an application program that manages the rack 2. Thus, the processing unit 207 is implemented by the CPU 51, FWH 52, memory 53, HDD 55, and controller 58.

Figure 2:
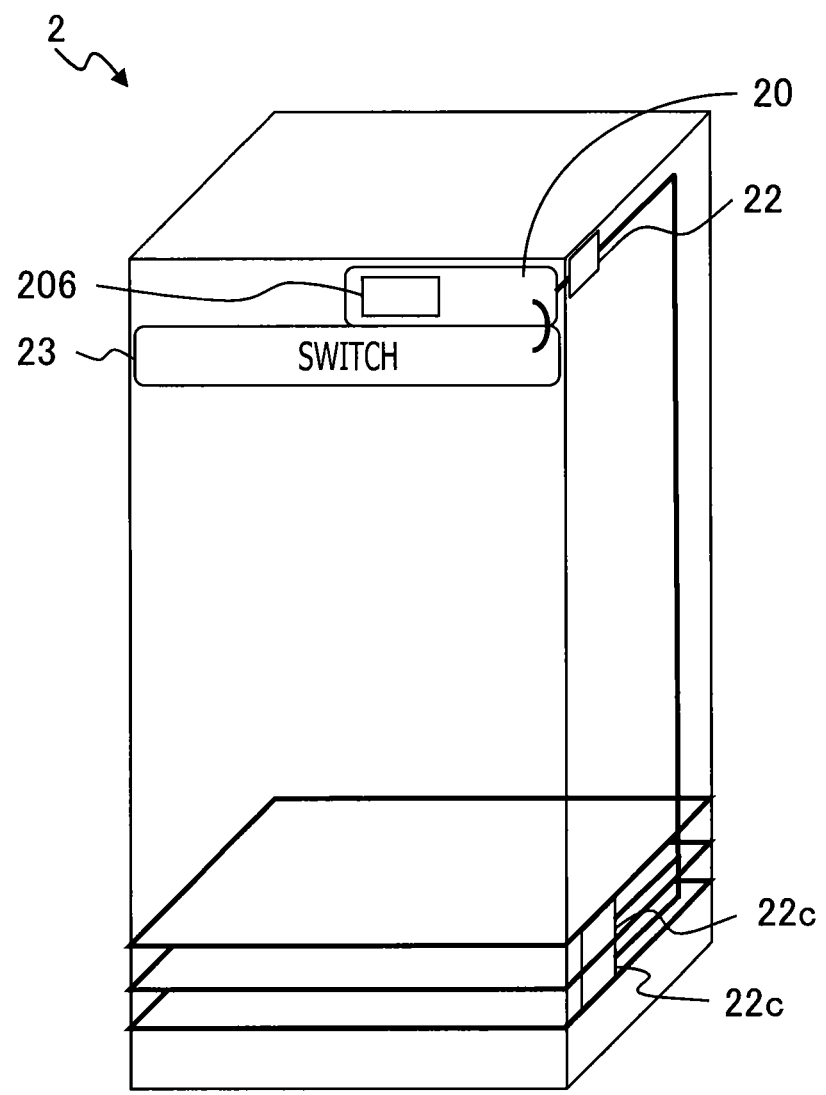
FIG. 2 illustrates a structure of a rack.

The position determining unit 207d uses the information reading apparatus 22 to make position determining. Each rack 2 has an outside shape as illustrated in FIG. 2, for example. The rack management apparatus 20 is placed at the top of the case of the rack 2, and switch 23 is placed below the rack management apparatus 20. The display unit 206 is placed on a front surface of the rack management apparatus 20. The information reading apparatus 22 is placed on a side surface of the rack management apparatus 20.

As described above, each rack 2 may accommodate a plurality of servers 24. The height of each server 24 is defined in the unit U. The rack 2 includes a plurality of stages. The rack 2 may accommodate a server 24 with a size of 1 U on each stage. The information reading apparatus 22, which identifies the type of server 24 accommodated in each stage, includes a controller 22a and a sensor group 22b, as illustrated in FIG. 1. A sensor 22c, which is any one included in the sensor group 22b is placed on each stage of the rack 2.

Figure 3:
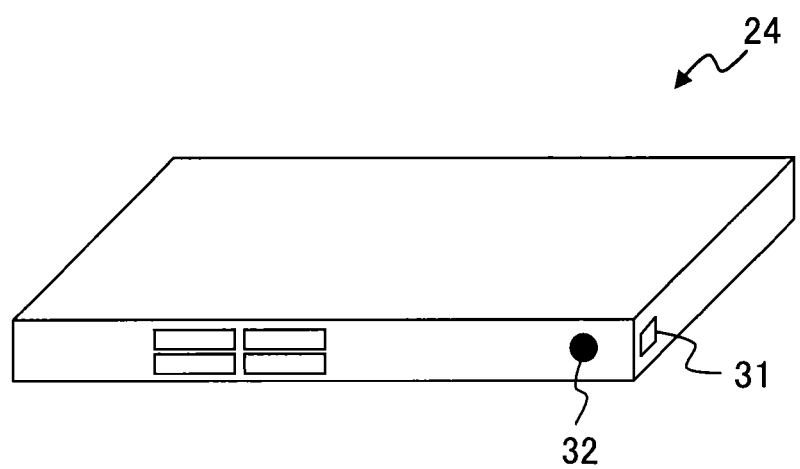
FIG. 3 illustrates a method of identifying a new server to be placed.

In this embodiment, the server 24 assumed to be mounted in the rack 2 has a recording medium 31 attached to a side surface of the case, as illustrated in FIG. 3. The power supply switch 32 is placed on a front surface of the server 24. The sensor 22c attached to each stage of the rack 2 reads information stored in the recording medium 31 attached to the case of the server 24. The recording medium 31 records therein server type information which represents the type of server 24. Although there is no particular limitation on the recording medium 31, the recording medium 31 may be a medium on which a barcode has been printed or a radio frequency identification (RFID) tag, for example.

A new server 24 with a height of 2 U or more may be accommodated. If one recording medium 31 is attached to this type of server 24, it is desirable to determine in advance a position, on the server 24, in which to attach the recording medium 31. The position may be within the range of 1 U on the bottom or the top of the server 24.

Some racks include a cooling device, that is, a fan, an air conditioner, or the like. From a viewpoint of outside shapes, racks are classified into racks having only posts, racks having walls on sides orthogonal to the direction in which the server 24 is inserted, racks having a sealed structure, and the like. The rack 2 in this embodiment is assumed to have no cooling device as illustrated in FIG. 1.

The position determining unit 207d receives, for example, the placement management information about the new server 24 to be accommodated and instructs the controller 22a in the information reading apparatus 22 so as to enable the sensor 22c to read the recording medium 31.

The controller 22a in the information reading apparatus 22 monitors the result of the reading by each sensor 22c included in the sensor group 22b. When a recording medium 31 is newly read by any sensor 22c, the controller 22a sends the server type information that has been read from the recording medium 31 and the position of the sensor 22c that has read the server type information to the rack management apparatus 20. The position determining unit 207d determines based on the position of the sensor 22c whether the server 24 has been accommodated in the correct place and also determines whether the accommodated server 24 is of the correct type.

When a server 24 receives electric power, the BMC 59 of the server 24 starts to operate. After having started to operate, the BMC 59 broadcasts a message to notify of its presence upon recognizing a connection to the network (a network device) through a communication cable. The connection determining unit 207e confirms based on this broadcasting that a power cable has been connected to the correct power supply connection port 43 and that the BMC 59 in the server 24 and the rack management apparatus 20 have been appropriately connected to each other with a communication cable.

As with the BMC 59, the NIC 54 may also recognize the connection to the network (a network device) through a communication cable. A recognition result is sent to the CPU 51. Upon receipt of the recognition result, the CPU 51 causes the NIC 54 to broadcast a message that notifies of the presence of the NIC 54. The connection determining unit 207e checks based on this broadcasting whether the new server 24 has been connected to the correct port of the switch 23.

Figure 8:
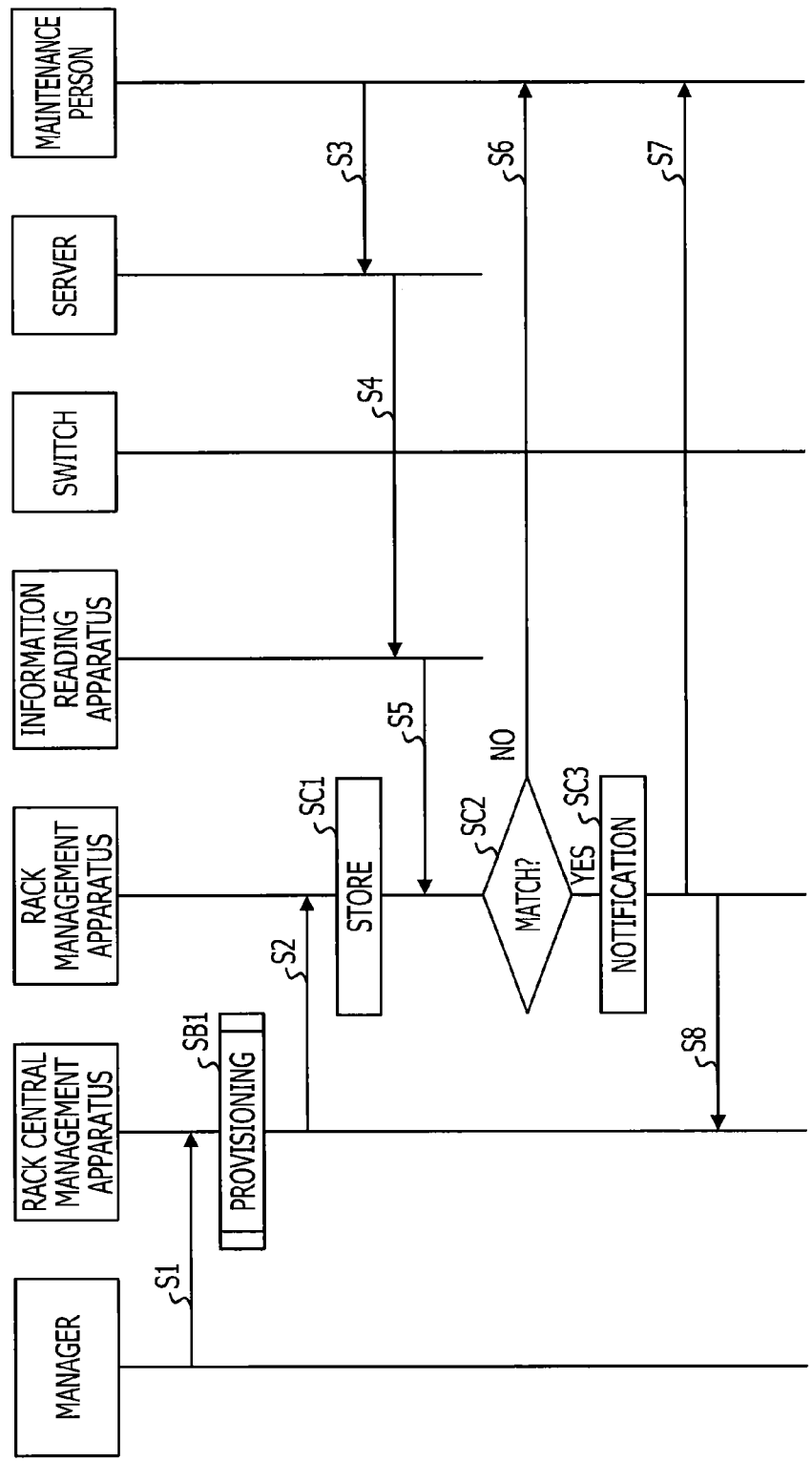
FIG. 8 is a sequence diagram when a new server is placed, indicating a flow of operations carried out by a console (manager), a rack central management apparatus, a rack management apparatus, an information reading apparatus, a switch, a new server to be placed, a PDU, and a maintenance person.
Figure 9:
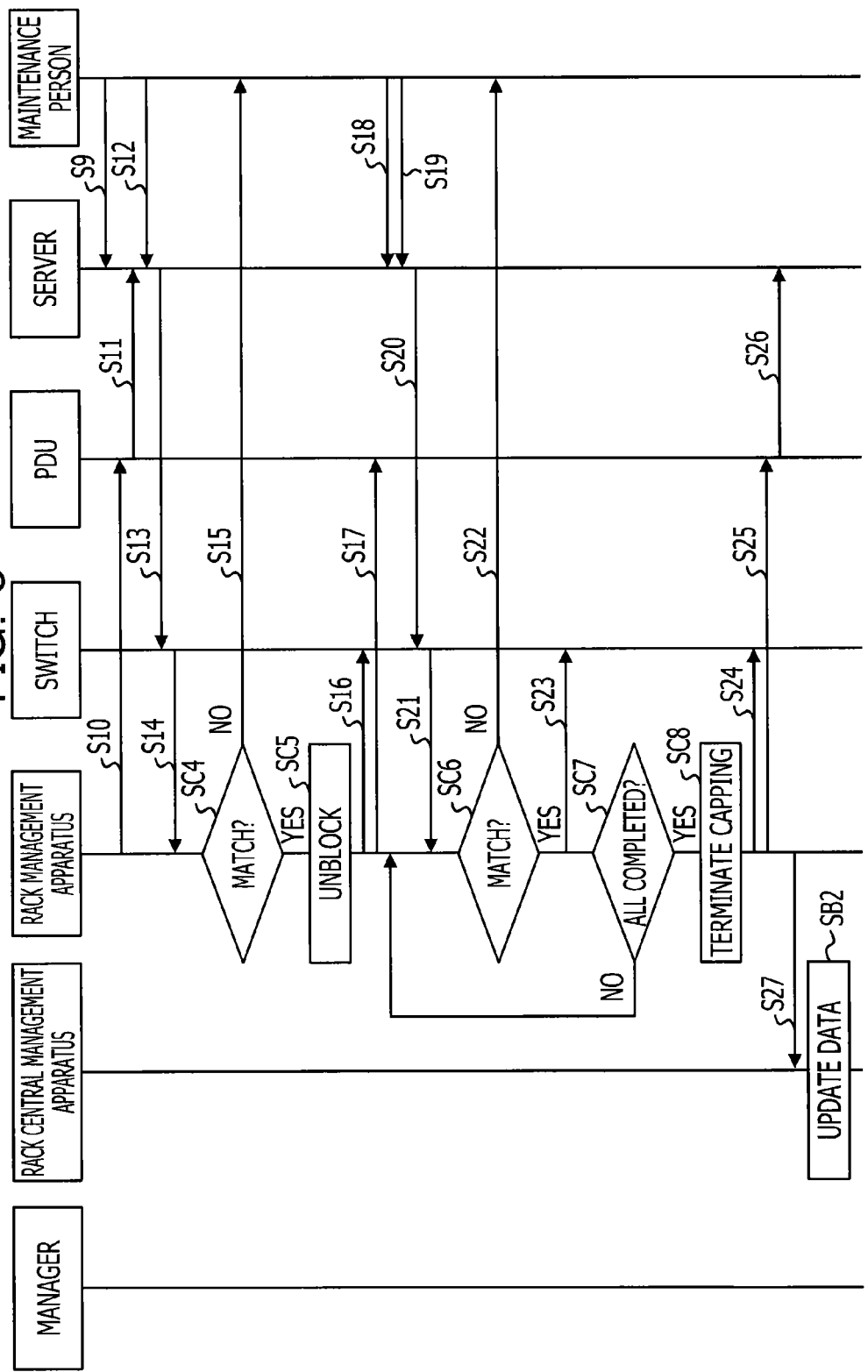
FIG. 9 is a sequence diagram that follows the sequence diagram in FIG. 8 when a new server is placed, indicating a flow of operations carried out by a console (manager), a rack central management apparatus, a rack management apparatus, an information reading apparatus, a switch, a new server to be placed, a PDU, and a maintenance person.

FIGS. 8 and 9 are sequence diagrams when a new server 24 is placed. The sequence indicates a flow of operations carried out by the console 5 (manager), the rack central management apparatus 1, rack management apparatus 20, information reading apparatus 22, switch 23, new server 24 to be placed, PDU 21, and a maintenance person. The maintenance person is a worker who actually mounts the server 24. These operations and their flow will be specifically described with reference to FIGS. 8 and 9. In FIG. 8, the console is represented as the manager.

As described above, after the manager has entered, for each new server 24, the server ID information, server type information, structure information, purpose information, and the network information other than the port number information into the console 5, the manager instructs determination of placement. The console 5 then sends the entered information items to the rack central management apparatus 1 in response to the instruction (S1). The rack central management apparatus 1 receives the information items and performs provisioning for the new server 24 (SB1). The placement determination processing in FIG. 10 is executed as one process for the provisioning. Placement management information created by executing the placement management processing is sent to the rack management apparatus 20 in the rack 2 that has been selected as a rack in which the new server 24 is placed (S2).

The rack management apparatus 20 receives the placement management information and stores it in the storage unit 208 (SC1). The rack management apparatus 20 instructs the controller 22a in the information reading apparatus 22 to read information from the sensor group 22b so as to enable the accommodation of the new server 24 in the relevant rack 2.

The manager notifies, for example, the maintenance person of information used for mounting the new server 24. The maintenance person prepares the new server 24 according to the notification and inserts the new server 24 into a specified place in a specified rack 2 (S3). When the new server 24 has been inserted, information recorded in the recording medium 31 attached to the new server 24 is read by the sensor 22c, which is any one included in the sensor group 22b (S4). Then, the controller 22a in the information reading apparatus 22 sends, to the rack management apparatus 20, the read information (including the server type information) and the positional information about the sensor 22c that has read the information (S5).

The rack management apparatus 20 determines whether the server type information and positional information received from the information reading apparatus 22 match the received placement management information (SC2). When the type of new server 24 does not match the received placement management information or the position into which the new server 24 is mounted is not correct, the determination result in SC2 is No. In this case, the rack management apparatus 20 displays, on the display unit 206, the type of new server 24 to be mounted or the correct mounting position, to notify the maintenance person of a work operation expected for the maintenance person to perform (S6). When the type of new server 24 is correct and its mounted position is also correct, the determination result in SC2 is Yes. In this case, the rack management apparatus 20 performs processing to notify the maintenance person and rack central management apparatus 1 of that fact (SC3). The maintenance person is notified by using the display unit 206 (S7). The rack 2 is notified through the communication unit 201 (S8). Part of the functions of the position determining unit 207d is implemented by executing the processing in SC2.

After having accommodated the new server 24 in the rack 2, the maintenance person connects a power cable to a specified power supply connection port 43 on the PDU 21 (S9). The rack management apparatus 20 instructs the PDU 21 to supply electric power substantially enough to operate only the BMC 59 in the new server 24 from the power supply connection port 43 specified in the placement management information (S10). When the power cable is connected to the specified power supply connection port 43 on the PDU 21, limited electric power starts to be supplied to the new server 24 (S11). The PDU control unit 207b controls this electric power supply executed by the PDU 21.

After having connected the power cable, the maintenance person connects communication cables between the BMC 59 and the switch 23 and between the NIC 54 and the switch 23 in that order. In view of a connection to an unanticipated device, the switch 23 is set so as to block data transfers via free ports.

The BMC 59 operates on supplied electric power. Thus, when the maintenance person connects the BMC 59 to the switch 23 (S12), the BMC 59 recognizes the connection to the switch 23 and sends the above message to the switch 23 (S13).

Upon receipt of the message, the switch 23 notifies the rack management apparatus 20 of the MAC address included in the message together with the number of the port at which the message has been received, as control information (S14).

The rack management apparatus 20 receives the control information by the communication unit 204 and determines whether the MAC address and the port number included in the received control information match the received placement management information (SC4). When the new server 24 is not correct (it is another server 24 of the same type) or the connected port is not correct, the determination result in SC4 is No. In this case, the rack management apparatus 20 displays, on the display unit 206, the correct new server 24 to be mounted or the number of the correct port to be connected, to notify the maintenance person of a work operation expected for the maintenance person to perform (S15). When the new server 24 is correct and the port to which the new server 24 has been connected is also correct, the determination result in SC4 is Yes. In this case, the rack management apparatus 20 determines to unblock the connected port (SC5). The rack management apparatus 20 then instructs the switch 23 to unlock the connected port (S16). The rack management apparatus 20 instructs the PDU 21 to supply electric power substantially enough for the new server 24 to start the BIOS (S17).

Part of the functions of the connection determining unit 207e is implemented by executing the processing in SC4. Part of the functions of the switching control unit 207c is implemented by executing the processing in SC5.

After having mutually connected the BMC 59 and switch 23, the maintenance person operates the power supply switch 32 on the new server 24 to operate the new server 24 (SC18). Then the maintenance person mutually connect the NIC 54 and the switch 23 (S19).

The BMC 59 recognizes that the power supply switch 32 has been operated and causes the CPU 51 to start the BIOS. In this case, the BMC 59 causes the CPU 51 to start only the BIOS with the supplied electric power.

When the BIOS starts, the NIC 54 also starts to operate. When the connection has been established, the NIC 54 recognizes the connection between the NIC 54 and the switch 23 and notifies the CPU 51 of a recognition result. The CPU 51 causes the NIC 54 to broadcast a message (S20). Upon receipt of the message, the switch 23 notifies the rack management apparatus 20 of the MAC address included in the message and the number of the port at which the message has been received, as control information (S21).

The rack management apparatus 20 receives the control information by the communication unit 204 and determines whether the MAC address and the port number included in the received control information match the network information in the received placement management information (SC6). The determination in SC6 is similar as in SC4, but practically, the determination result is No only when the connected port is not correct. This is because the result in SC4 has been determined to be Yes, so the new server 24 is correct (it is not another server 24 of the same type). Therefore, when the connected port is not correct, the rack management apparatus 20 displays, on the display unit 206, the port to be connected, to notify the maintenance person of a work operation expected for the maintenance person to perform (S22). When the connected port is correct, the determination result in SC6 is Yes. In this case, the rack management apparatus 20 determines to unblock (permit to connect) the connected port and instructs the switch 23 to unblock the connected port (S23).

Processing involved in connection of one NIC 54 is terminated when the connected port is unblocked. Since a plurality of NICs 54 may be mounted in the server 24, the rack management apparatus 20 then determines whether all NICs 54 have been connected (SC7). When connection confirmation has been completed for all network information items in the placement management information, the determination result in SC7 is Yes and the sequence proceeds to SC8. When there is remaining network information for which connection confirmation has not yet been completed, the determination result in SC7 is No, in which case the rack management apparatus 20 prepares for next control information sent from the switch 23.

The rack management apparatus 20 determines to unblock all connected ports in SC8. Thus, the rack management apparatus 20 causes the switch 23 to remove restrictions from all ports for which a connection to the new server 24 has been confirmed (S24) and instructs the PDU 21 to terminate capping by which supply of electric power is restricted (S25). The fact that the capping has been terminated is recognized by the BMC 59 in the new server 24 (S26). The BMC 59 then causes the CPU 51 to start the OS, making the new server 24 start to operate.

The rack management apparatus 20 notifies the rack central management apparatus 1 that connection operations have been completed (S27). Upon receipt of the notification, the rack central management apparatus 1 updates the state information in the operation status information in the relevant placement management information (SB2). In the example in FIG. 7, the relevant state information is changed from "TO BE PLACED" to "IN OPERATION", terminating the processing by the device management system involved in placing one new server 24.

Part of the connection determining unit 207e above may also be implemented by executing the processing in SC6 and SC7. Part of the switching control unit 207c may also be implemented by executing the processing in SC8.

In this embodiment, the recording medium 31 is attached to the server 24 so that when the server 24 is mounted in the rack 2, the type of server 24 is identified and whether the type is correct is determined. However, the determination may be carried out by another method. For example, the structure information about the server 24 may be obtained through the BMC 59. Therefore, whether the type of server 24 is correct may be determined by using the structure information, which may be obtained from the BMC 59.

In this embodiment, the amount of electric power to be supplied to the new server 24 is controlled to reduce or suppress an adverse effect caused when the new server 24 is connected to an inappropriate port, and information obtained from the switch 23 is used to determine whether the new server 24 has been correctly connected. This determination may be made by directly checking the port, of the switch 23, to which the new server 24 has been actually connected. The placement management information in this embodiment is automatically created by the rack central management apparatus 1 to reduce the burden of the manager. However, the manager may create the placement management information or change it, if desirable, in response to a request from a customer, for a reason related to operation in the data center, or for another reason.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device management system comprising:
    an accommodation apparatus including a plurality of storage spaces, each of the plurality of storage spaces being capable of storing an electronic device;
    a network device that is connected to an electronic device accommodated in the accommodation apparatus; and
    a device management apparatus including a processor to
        obtain connection information when a first electronic device is expected to be newly placed in the accommodation apparatus, the connection information indicating an expected connection point in the network device, the first electronic device being expected to be connected to the network device at the expected connection point with a cable,
        identify an actual connection point at which the network device has been connected to the first electronic device with the cable,
        determine, based on the connection information, whether the actual connection point is the expected connection point by comparing the actual connection point to the expected connection point, and
    control a supply of electric power to the first electronic device based on a determination of whether the actual connection point is the expected connection point.

2. The device management system according to claim 1, wherein the processor controls, based on a result of the determination, the network device connected to the first electronic device.

3. The device management system according to claim 1, wherein the processor further
    obtains positional information indicating a first position of an expected storage space in the accommodation apparatus, the expected storage space being expected to accommodate the first electronic device,
    identifies a second position of an actual storage space in which the first electronic device has been actually accommodated, and
    determines, based on the positional information, whether the second position is appropriate.

4. The device management system according to claim 3, wherein the processor further
    obtains type information that indicates a type of an electronic device expected to be accommodated in the accommodation apparatus,
    indentifies an actual type of the first electronic device; and
    determines, based on the type information, whether the actual type is appropriate.

5. The device management system according to claim 3, wherein the processor determines at least one of the expected storage space and the expected connection point.

6. The device management system according to claim 1, wherein the processor further
    obtains type information that indicates a type of an electronic device expected to be accommodated in the accommodation apparatus,
    indentifies an actual type of the first electronic device; and
    determines, based on the type information, whether the actual type is appropriate.

7. The device management system according to claim 1, wherein the processor determines the expected connection point.

8. The device management system according to claim 1, wherein the processor obtains the connection information when the first electronic device is expected to be newly placed in the accommodation apparatus prior to the first electronic device actually being placed in the accommodation apparatus.

9. A device management apparatus for managing an electronic device to be placed in an accommodation apparatus and to be connected to a network device, the device management apparatus comprising a processor to
    obtain connection information when the electronic device is expected to be placed in the accommodation apparatus, the connection information indicating an expected connection point in the network device, the electronic device being expected to be connected to the network device at the expected connection point with a cable,
    identify an actual connection point at which the network device has been connected to the electronic device with the cable,
    determine, based on the connection information, whether the actual connection point is the expected connection point by comparing the actual connection point to the expected connection point, and
    control a supply of electric power to the electronic device based on a determination of whether the actual connection point is the expected connection point.

10. The device management apparatus according to claim 9, wherein the processor obtains the connection information when the first electronic device is expected to be placed in the accommodation apparatus prior to the first electronic device actually being placed in the accommodation apparatus.

11. A non-transitory computer-readable recording medium storing a program that causes a computer to execute a procedure for managing an electronic device to be placed in an accommodation apparatus and to be connected to a network device, the procedure comprising:
    obtaining connection information when the electronic device is expected to be placed in the accommodation apparatus, the connection information indicating an expected connection point in the network device, the electronic device being expected to be connected to the network device at the expected connection point with a cable,
    identifying an actual connection point at which the network device has been connected to the electronic device with the cable,
    determining, based on the connection information, whether the actual connection point is the expected connection point by comparing the actual connection point to the expected connection point, and
    controlling a supply of electric power to the electronic device based on a determination of whether the actual connection point is the expected connection point.

12. The computer-readable recording medium according to claim 11, wherein the procedure includes obtaining the connection information when the first electronic device is expected to be placed in the accommodation apparatus prior to the first electronic device actually being placed in the accommodation apparatus.

* * * * *